(12) United States Patent
Hasuo

(10) Patent No.: US 9,479,607 B2
(45) Date of Patent: Oct. 25, 2016

(54) CONTENT CACHING AND DELIVERING SYSTEM WITH TRAFFIC OF REPETITIVELY REQUESTED CONTENT REDUCED

(71) Applicant: Oki Electric Industry Co., Ltd., Tokyo (JP)

(72) Inventor: Satoshi Hasuo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 120 days.

(21) Appl. No.: 13/939,661

(22) Filed: Jul. 11, 2013

(65) Prior Publication Data

US 2014/0082123 A1   Mar. 20, 2014

(30) Foreign Application Priority Data

Sep. 19, 2012   (JP) .................................. 2012-206007

(51) Int. Cl.

| H04L 29/08 | (2006.01) |
| H04N 21/658 | (2011.01) |
| H04N 21/858 | (2011.01) |
| H04L 29/06 | (2006.01) |
| H04L 12/58 | (2006.01) |

(52) U.S. Cl.
CPC ......... *H04L 67/2842* (2013.01); *H04L 63/104* (2013.01); *H04L 65/4084* (2013.01); *H04L 65/605* (2013.01); *H04N 21/6581* (2013.01); *H04N 21/8586* (2013.01); *H04L 29/08* (2013.01); *H04L 51/04* (2013.01); *H04L 63/0281* (2013.01); *H04L 65/1016* (2013.01)

(58) Field of Classification Search
CPC ............... H04L 29/06; H04L 67/1008; H04L 67/1014; H04L 67/1023; H04L 67/2842; H04L 67/327
See application file for complete search history.

(56) References Cited

U.S. PATENT DOCUMENTS

| 8,458,290 B2* | 6/2013 | Black ................. H04L 67/1097 709/217 |
| 2001/0056416 A1* | 12/2001 | Garcia-Luna-Aceves ............... G06F 12/1483 |
| 2002/0059371 A1* | 5/2002 | Jamail ..................... H04L 29/06 709/203 |
| 2003/0018753 A1* | 1/2003 | Seki ..................... H04L 12/2803 709/219 |
| 2009/0092124 A1* | 4/2009 | Singhal ................. H04L 67/104 370/351 |

(Continued)

FOREIGN PATENT DOCUMENTS

| JP | 2002-163142 A | 6/2002 |
| WO | WO 2011-049193 A1 | 4/2011 |

OTHER PUBLICATIONS

Shogo Ando et al., "A Study of In-Network Cache for Redundancy Elimination at Network Edges", the Institute of Electronics, Information and Communication Engineers (IEICE), Technical Report of IEICE, Jul. 2011, pp. 1-8.

*Primary Examiner* — Barbara Burgess
(74) *Attorney, Agent, or Firm* — Rabin & Berdo, P.C.

(57) ABSTRACT

A content caching and delivering apparatus transmits and receives communication signals in between a content delivering apparatus delivering content on a telecommunications network and communication terminals. A content storage stores content delivered by the content caching and delivering apparatus. A delivery controller receives a content delivery request for the content stored in the content storage, and maps information on the position of the requested content to information on the content for each terminal and manages the mapping. The delivery controller delivers the requested content to the communication terminal.

14 Claims, 10 Drawing Sheets

(56) References Cited

U.S. PATENT DOCUMENTS

| | | | | |
|---|---|---|---|---|
| 2009/0193129 A1* | 7/2009 | Agarwal | ............ | H04L 63/0281 709/229 |
| 2010/0312851 A1* | 12/2010 | Jackson | ................ | H04L 67/104 709/217 |
| 2012/0278487 A1* | 11/2012 | Woelfel | ............. | H04L 61/2596 709/226 |
| 2013/0244614 A1* | 9/2013 | Santamaria | ............. | H04L 51/04 455/411 |
| 2014/0052770 A1* | 2/2014 | Gran | ................ | H04N 21/26258 709/203 |
| 2014/0115037 A1* | 4/2014 | Liu | ..................... | H04L 65/1016 709/203 |
| 2014/0372627 A1* | 12/2014 | Axelrod | .................. | G06F 11/20 709/241 |

* cited by examiner

FIG. 7

| CONTENT DELIVERING APPARATUS ADDRESS ~711 | TERMINAL ADDRESS ~713 | CONTENT ID ~715 | ONE-TIME URL ~717 | |
|---|---|---|---|---|
| 288.000.000.001 | 288.000.000.002 | 1 | | ~701 |
| 288.000.000.001 | 288.000.000.002 | 1 | http://sample.com1 | ~702 |
| ⋮ | ⋮ | ⋮ | ⋮ | |
| | 288.000.000.002 | 1 | http://sample.com2 | ~703 |
| ⋅ ⋅ ⋅ | ⋅ ⋅ ⋅ | ⋅ ⋅ ⋅ | ⋅ ⋅ ⋅ | |

719 ↗

700

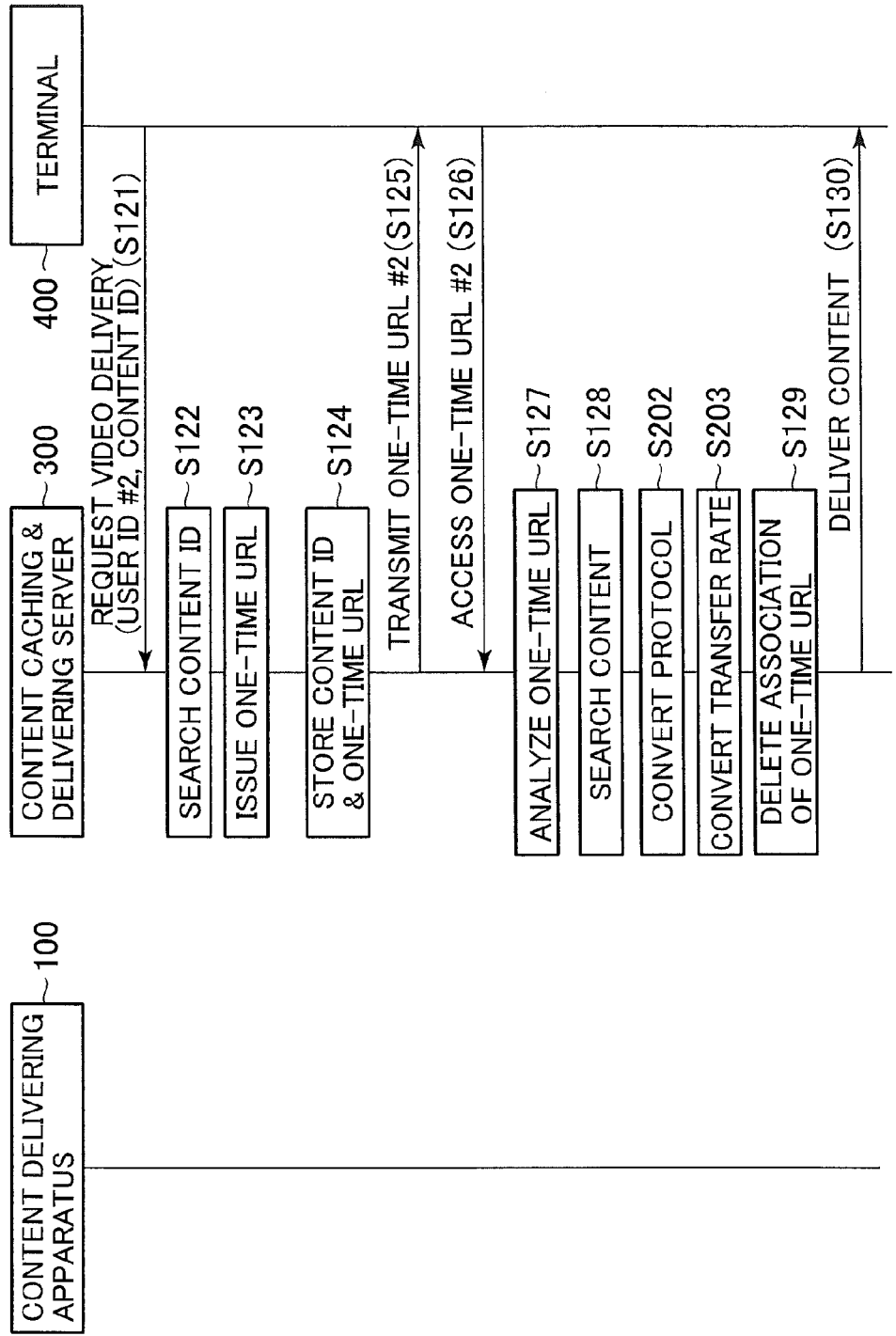

CONTENT CACHING AND DELIVERING SYSTEM WITH TRAFFIC OF REPETITIVELY REQUESTED CONTENT REDUCED

BACKGROUND OF THE INVENTION

1. Field of the Invention

The present invention relates to a content delivering system, and more particularly to a content caching and delivering apparatus delivering content, for instance, over a telecommunications network, and to a method therefor.

2. Description of the Background Art

Recently, among content delivering services, video delivering services are increasingly utilized to deliver streams of video data over a telecommunications network. It is said that video traffic of delivering video data occupies the majority of network traffic. It is also well-known that a lot of overlapping video data is flowing in the video traffic. Thus, reduction in the traffic for the overlapping video data would cause the load of video traffic to be reduced, thereby improving the efficiency of traffic on the entire network.

Conventionally, as one solution for reducing the traffic for overlapping video data, there is in-network caching disclosed in Shogo Ando et al., "A Study of In-Network Cache for Redundancy Elimination at Network Edges", the Institute of Electronics, Information and Communication Engineers (IEICE), Technical Report of IEICE, 2011.

In utilization of the above-mentioned in-network caching, packets passing between any couple of routers are cached and a packet overlapping, or duplicate, with a cached packet is refrained from being transferred between the routers, and instead a substitute packet is sent from the cache of the router on destination side, thereby eliminating the duplication of packets between the routers and thus reducing the video traffic.

In a content delivering way according to the conventional in-network caching, a terminal requests video delivery of a content delivering apparatus via a content caching and delivering server. In view of security, the content delivering apparatus issues a one-time URL (Uniform Resource Locator) as an access destination of content.

The content caching and delivering server transfers the one-time URL from the content delivering apparatus to the requesting terminal, and links and manages the issued one-time URL with an identification (ID) of the content requested.

When the requesting terminal accesses the content delivering apparatus with the one-time URL in order to acquire the content, the content delivering apparatus sends the content associated with the one-time URL to the terminal. At that moment, the content caching and delivering server caches the content from the content delivering apparatus. Subsequently, when another video delivery for the same content as the cached content is requested, the content caching and delivering server deliveries the content it caches.

However, in the above-mentioned conventional content delivering solution, the content delivering apparatus issues a one-time URL each time a content delivery request is raised. In addition, the content caching and delivering server has to link and manage the one-time URLs with content identifications.

Therefore, when different content delivery requests issue to the same content, different response messages, which include respective one-time URLs, are issued in response to content delivery requests. In addition, request messages, which include different one-time URLs, for content delivery from the terminals are different each time, too. There is then a problem that the content caching and delivering server cannot efficiently cache contents to content delivery requests.

SUMMARY OF THE INVENTION

It is an object of the present invention to provide a content caching and delivering apparatus and a method therefor enabling a content caching and delivering server or apparatus to efficiently cache content when deferent access destinations are issued for video delivering requests to thereby accomplish reduction of traffic on a telecommunications network in repetitive delivery for the same content.

In accordance with the present invention, a content caching and delivering apparatus, which transmits and receives a communication signal in between a content delivering apparatus delivering content over a telecommunications network and a communication terminal, comprises a content storage which stores the content delivered by the content delivering apparatus, and a delivery controller operative in response to a content delivery request for the content stored in the content storage to map, for each communication terminal, first information on the position of the requested content to second information on the content and manage the mapping, and to deliver the requested content to the communication terminal.

Further in accordance with the present invention, a method in a content caching and delivering apparatus transmitting and receiving a communication signal in between a content delivering apparatus delivering content over a telecommunications network and a communication terminal comprises storing in a content storage the content delivered by the content delivering apparatus, and controlling delivery of the content, when a content delivery request for the content stored in the content storage, to map, for the communication terminal, first information on a position of the requested content to second information on the content and managing the mapping, and delivering the requested content to the communication terminal.

Also in accordance with the present invention, a content delivering system comprises a content delivering apparatus delivering content over a telecommunications network, and a communication terminal acquiring the content, in addition to the content storage and the delivery controller set forth above.

According to the present invention, it is possible to efficiently cache content by the content caching and delivering apparatus, thereby accomplishing reduction of traffic of the same contents repetitively requested for delivery on a telecommunications network.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which:

FIG. 7 shows an example of one-time URL mapping information in the storage in accordance with the illustrative embodiment;

FIG. 10 is a sequence chart useful for understanding the operation of delivering content in response to a subsequent video delivery request for the same content in the alternative embodiment.

DESCRIPTION OF THE PREFERRED EMBODIMENTS

Figure 1:
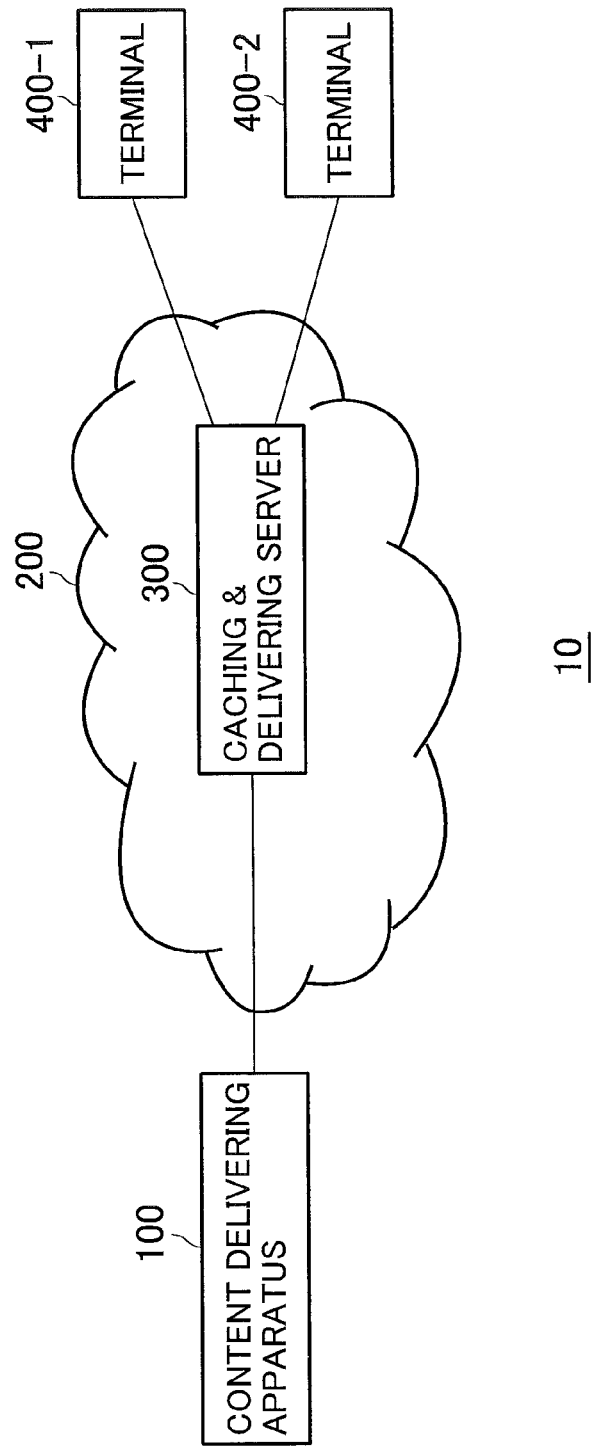
FIG. 1 is a schematic block diagram showing the general configuration of a content delivering system in accordance with an illustrative embodiment of the present invention.

First, with reference to the accompanying drawings, an illustrative embodiment of a content delivering system in accordance with the present invention will be described in detail. FIG. 1 schematically shows the general configuration of an illustrative embodiment of a content delivering system in which the present invention is applied to in-network caching.

With reference to FIG. 1, the content delivering system 10 of the illustrative embodiment includes a content delivering apparatus 100 and two terminals 400-1 and 400-2, which are connected to a telecommunications network 200. Although FIG. 1 illustrates the two terminals for simplicity, the system 10 may in practice include more terminals.

The telecommunications network 200 may be, for instance, an IP (Internet Protocol) network, and may include one or more content caching and delivering servers, generally 300, which are arranged to cache and distribute contents of services provided by the content delivering apparatus 100. The network 200 may be adapted for distributing cached contents by the content caching and delivering server 300, and thus may be called as a content delivery network.

The terminals 400-1 and 400-2, which may generally be designated with a reference numeral 400, are adapted to transmit a content delivery request message to the content delivering apparatus 100, and acquire a stream of the content to play the content thereon. With the illustrative embodiment, contents may be video contents, and the terminals 400-1 and 400-2 may be adapted to visualize, or play, video data. The terminals 400-1 and 400-2 may be implemented by various kinds of information processors having communication capability. For example, a television set, a personal computer, such as a desktop, laptop or tablet type computer, a set top box (STB), a game terminal and a variety of mobile terminals, such as a smart phone, a cellular phone, a personal digital assistant (PDA) or an electronic book terminal may be applied as the terminals 400.

The terminals 400-1 and 400-2 are connected to the content caching and delivering server 300 and adapted to transmit a content delivery request message via the content caching and delivering server 300 to the content delivering apparatus 100.

The terminals 400-1 and 400-2 may receive, via the content caching and delivering server 300, a response message the content delivering apparatus 100 has transmitted in response to the content delivery request, i.e. video delivering request. The response message to content delivery request includes a one-time URL (Uniform. Resource Locator) issued by the content delivering apparatus 100. In the context, the term "one-time URL" may be comprehended in such a broader sense as a provisional URL effective to an access or accesses only momentarily, in a limited period of time, and/or at a limited number of times, e.g. once. With the illustrative embodiment, merely for illustration, the one-time URL may be effective to just a single access preferably made in a predetermined length of period. The terminals 400-1 and 400-2 may also receive another response message the content caching and delivering server 300 has issued in response to the content delivery request. The other response message to content delivery request includes a one-time URL issued by the content caching and delivering server 300.

The terminals 400-1 and 400-2 may make access to the one-time URL to acquire a stream of the content to play the content.

The content caching and delivering server 300 is connected to the terminals 400-1 and 400-2 and the content delivering apparatus 100, and adapted to cache information on content received from the content delivering apparatus 100.

The content caching and delivering server 300 is also adapted to obtain information on content from a content delivery request message received from the terminal 400-1 or 400-2 to compare the obtained information on content with the cached information on content. When both of the information on content are accorded with each other, the content caching and delivering server 300 generates and transmits a one-time URL to the terminal 400-1 or 400-2 in question.

When the information on content obtained is not accorded with the stored one, the content caching and delivering server 300 relays the content delivery request message containing the information on content obtained to the content delivering apparatus 100. Subsequently, the content caching and delivering server 300 may receive a response message to the content delivery request message from the content delivering apparatus 100, and then store a one-time URL included in the response message and forward the response message to the terminal 400.

The content caching and delivering server 300 may receive access to a one-time URL from the terminals 400-1 and 400-2. When the received one-time URL is a one-time URL which the content caching and delivering server 300 has issued, the content caching and delivering server 300 delivers a stream of the cached content to the terminals 400-1 and 400-2.

When the received one-time URL is a one-time URL issued by the content delivering apparatus 100, the content caching and delivering server 300 transfers the received one-time URL to the content delivering apparatus 100. In reply, the content caching and delivering server 300 may receive and cache a stream of the content delivered by the content delivering apparatus 100 and relay that stream of the content to the terminals 400-1 and 400-2.

The content caching and delivering server 300 may be arranged nearer to the terminals 400-1 and 400-2 on the network 200 to deliver a stream of content at a transmission rate closer to the transmission rate at which the content delivering apparatus 100 produces the stream of content. For instance, it is preferable that the content caching and delivering server 300 is arranged at the position of a network device, such as a gateway or a router, on the network to which the terminals 400-1 and 400-2 are belong, or at the position of a wireless base station or a switching system from which the terminals 400-1 and 400-2 may receive content streams on wireless transmission.

When the content delivering apparatus 100 receives a content delivery request message from the terminals 400-1 and 400-2 via the content caching and delivering server 300, the apparatus 100 acquires information on the content from the received message and issues a one-time URL. The content delivering apparatus 100 transmits the issued one-time URL to the terminals 400 via the content caching and delivering server 300.

When the content delivering apparatus 100 receives access to an one-time URL from the terminals 400-1 and 400-2 via the content caching and delivering server 300 and the received one-time URL is accordant with the own issued one-time URL, the apparatus 100 delivers a content stream associated with that one-time URL to the terminals 400-1 and 400-2 via the content caching and delivering server 300.

Figure 2:
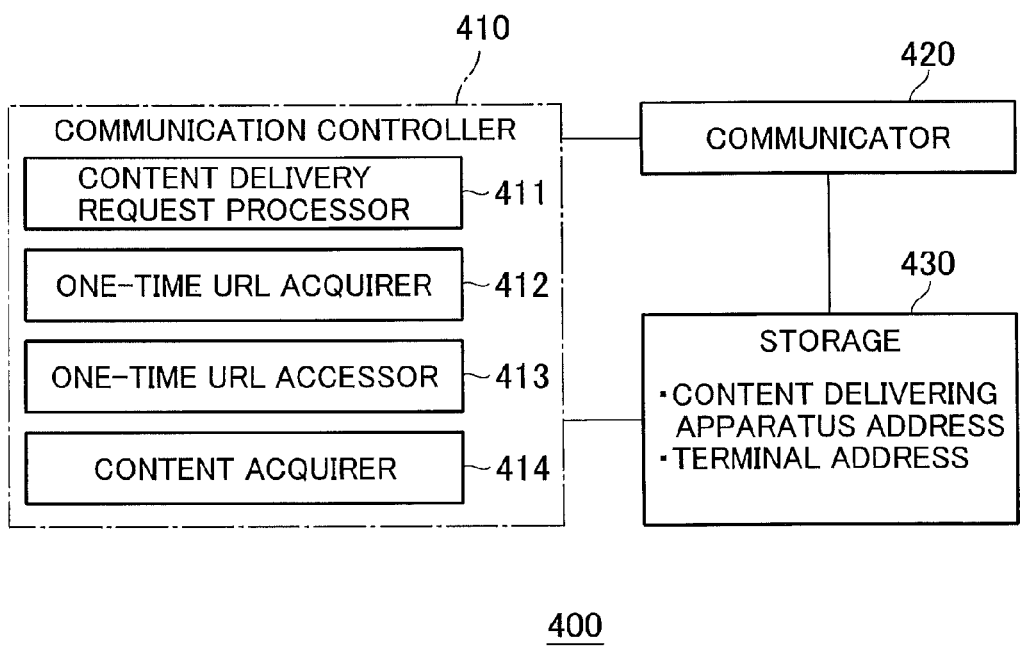
FIG. 2 is a schematic block diagram showing the internal configuration of a terminal in accordance with the illustrative embodiment shown in FIG. 1.

Now, FIG. 2 schematically shows the internal configuration of the terminal 400-1 or 400-2, generally 400, in accordance with the illustrative embodiment. Because the terminals 400-1 and 400-2 may have the configuration thereof similar to each other, the representative terminal 400 is illustrated in FIG. 2.

As seen from FIG. 2, the terminal 400 may generally comprise a communication controller 410, a communicator 420 and a storage 430, which are interconnected as shown. For instance, the terminal 400 may include a processor system comprising a central processing unit (CPU), a read only memory (ROM), a random access memory (RAM), an electrically erasable programmable ROM (EEPROM), an input and output interface and a communication device although not specifically depicted. The functions of the terminal 400 may, at least partially, be implemented by running program sequences, or control strategy, stored in the ROM, on the CPU.

The terminal 400 is depicted and described as configured by separate functional blocks, such as content acquirer 414. It is however to be noted that such a depiction and a description do not restrict them to an implementation only in the form of hardware but at least partially or entirely may be implemented by software. That may also be the case with illustrative embodiments which will be described below. In this connection, the word "circuit" or "section" may be understood not only as hardware, such as an electronics circuit, but also as a function that may be implemented by software installed and executed on a computer.

The communicator 420 is adapted to transmit and receive signals to and from the content caching and delivering server 300 or to the content delivering apparatus 100 via the server 300. For instance, the communicator 420 carries out the communicating process on its communication protocol, the Internet protocol (IP) with the instant embodiment, to assemble signals or messages the terminal 400 transmits into packets and disassemble packets the terminal 400 has received into signals, messages or streams.

The storage 430 may store, for example, address information of the content delivering apparatus 100 and of the terminal itself, i.e. the terminal 400 including that storage 430.

The communication controller 410 is adapted to control the communicating process for content delivery. As shown in FIG. 2, the communication controller 410 includes a content delivery request processor 411, a one-time URL acquirer 412, a one-time URL accessor 413 and a content acquirer 414.

The content delivery request processor 411 is adapted to transmit a content delivery request message to the content delivering apparatus 100, the message having address information of the apparatus 100 as a destination address and address information of the terminal as a source address. For instance, the content delivery request message includes content identifying information, such as a content identification (ID) or a content path, for indicating content to be requested. With the illustrative embodiment, the content identifying information may be a content identification merely for the purpose of illustration.

The one-time URL acquirer 412 is adapted to acquire a one-time URL included in a response message to a content delivery request message.

The one-time URL accessor 413 is adapted to access an acquired one-time URL.

The content acquirer 414 is adapted to acquire a content stream from a content device to be accessed in accordance with the one-time URL accessed by the one-time URL accessor 413. The content acquirer 414 plays content or video data from the acquired content stream.

Figure 3:
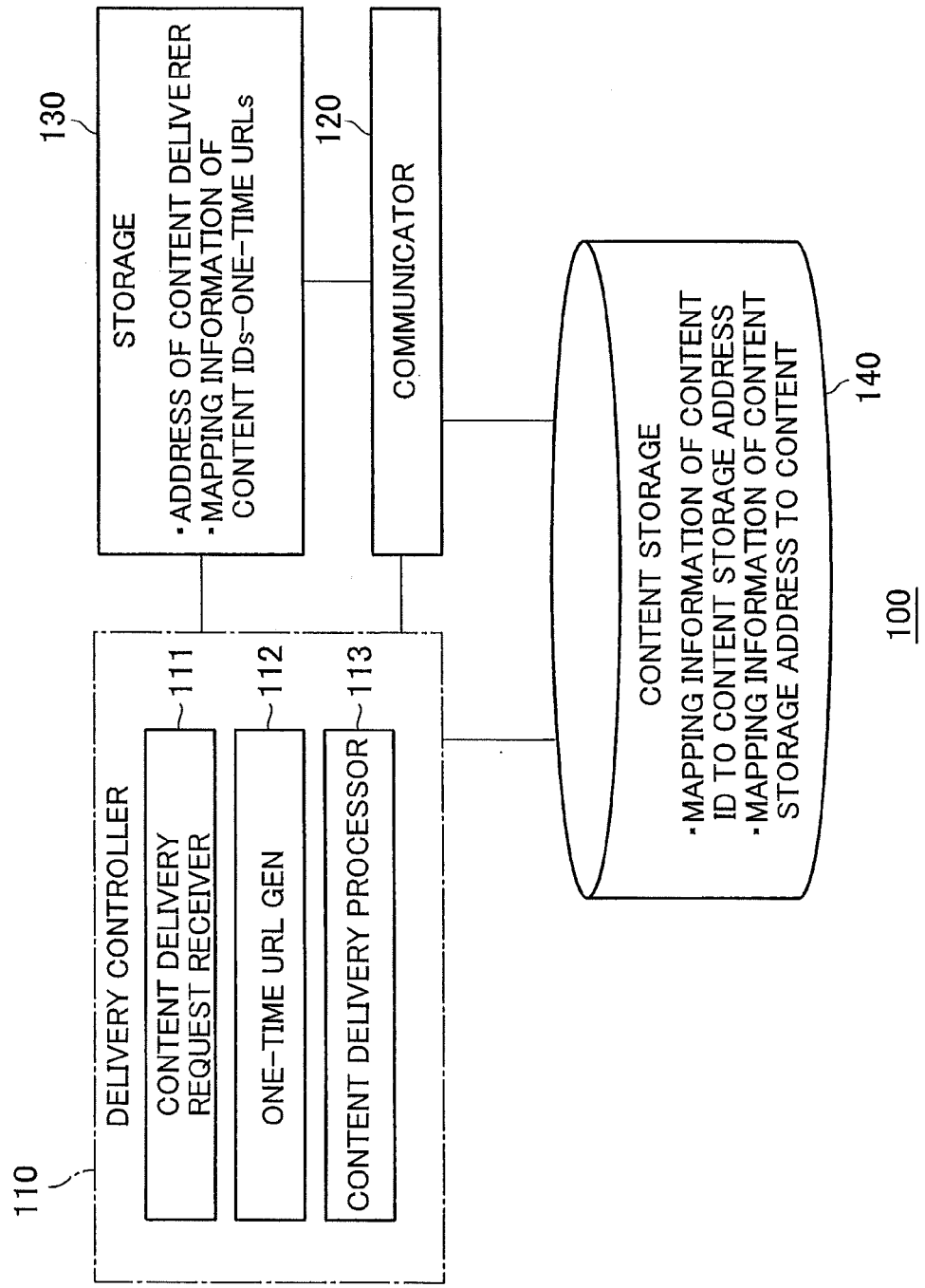
FIG. 3 is a schematic block diagram showing the internal configuration of a content delivering apparatus in accordance with the illustrative embodiment.

FIG. 3 schematically shows the internal configuration of the content delivering apparatus 100 in accordance with the illustrative embodiment. As shown in the figure, the content delivering apparatus 100 may generally include a delivery controller 110, a communicator 120, a storage 130 and a content storage 140, which are interconnected as illustrated.

For instance, the content delivering apparatus 100 may also be implemented by a processor system comprising a CPU, a ROM, a RAM, an EEPROM, an input and output interface and a communication device although not specifically shown. The functions of the apparatus 100 may be implemented, at least partly, by program sequences or control procedures stored in the ROM and running on the CPU.

The communicator 120 is adapted to transmit and receive signals to and from the content caching and delivering server 300 or the terminal 400 via the server 300. For instance, the communicator 120 carries out the communicating process by using the Internet protocol as its communication protocol to assemble signals or messages to be transmitted by the content delivering apparatus 100 to packets and to disassemble packets received by the content delivering apparatus 100 to signals, messages or streams.

The storage 130 may store, for example, address information of the content delivering apparatus 100 or mapping information for mapping content identifications in content delivery requests to one-time URLs issued by the delivery controller 110, described later.

The content storage 140 is adapted to store plural content streams. The content storage 140 also stores mapping information for mapping respective content identifications for plural contents to the addresses of content storage locations, i.e. content storage addresses, as addresses on its database and other mapping information such as for mapping the addresses of content storage locations to content streams.

The delivery controller 110 is adapted to control the delivery or distribution of contents stored in the content storage 140. As shown in FIG. 3, the delivery controller 110 may include a content delivery request receiver 111, a one-time URL generator 112 and a content delivery processor 113.

The content delivery request receiver 111 is adapted to receive a request message for content delivery to determine a content identification and a source address included in the received request message.

The one-time URL generator 112 is adapted to acquire a content identification and a source address included in a delivery request from the content delivery request receiver 111 to issue a one-time URL as a destination access of content. The one-time URL generator 112 stores in the storage 130 mapping information for mapping the issued one-time URL to the content identification associated with the delivery request. The one-time URL generator 112 transmits a response message including the issued one-time URL toward the source of the delivery request.

The content delivery processor 113 is adapted to receive access to a one-time URL from a terminal 400 via the content caching and delivering server 300, and then reference the mapping information of the content identifications to one-time URLs in the storage 130 to thereby determine whether or not the access is directed to the content delivering apparatus 100. That is, the processor 113 decides whether or not the one-time URL in the access is one issued by the content delivering apparatus 100.

When the one-time URL in the access is coincident with one stored into the storage 130, the content delivery processor 113 accepts the access to the content delivering apparatus 100. That is, the processor 113 reads out a content stream associated with that one-time URL from the content storage 140 and transmits the content stream to the source of the delivery request.

More specifically, the content delivery processor 113 obtains a content identification corresponding to the one-time URL from the storage 130. The processor 113 references the mapping information of the content identifications to the content storage addresses in the content storage 140 to read out a content storage address associated with the obtained content identification. In turn, the processor 113 refers to the mapping information of the content storage addresses to content streams in the content storage 140 to read out a content stream corresponding to the read-out content storage address. Thus, it is possible to deliver the content stream corresponding to the one-time URL to the source of the delivery request.

After the content stream of the content identification corresponding to the one-time URL has been transmitted to the terminal 400 to which the one-time URL is allotted, the content delivery processor 113 deletes from the storage 130 the mapping information of the content identification to the one-time URL in question.

Now, with reference to FIG. 4, description will be made on the internal configuration of the content caching and delivering server 300 in accordance with the illustrative embodiment. As shown in the figure, the content caching and delivering server 300 generally includes a relay controller 310 and a content storage 360 connected to the controller 310.

Again, the content caching and delivering server 300 may, for instance, be implemented by a processor system comprising a CPU, a ROM, a RAM, an EEPROM, an input and output interface and a communication device. The functions of the server 300 may be implemented, at least partly, by program sequences stored in the ROM and running on the CPU.

The relay controller 310 is adapted to control relay or transfer of packets received from the terminals 400 or content delivering apparatus 100. The relay controller 310 includes a relay processor 320, a communication signal analyzer 330, a delivery controller 340 and a storage 350, which are interconnected as shown.

The storage 350 stores, for example, the address information of the content delivering apparatus 100 and of the content caching and delivering server 300 itself, i.e. the server 300 containing the storage 350. The storage 350 also stores, for example, mapping information containing the addresses of a content delivering apparatus and a terminal, an content identification and a one-time URL. Such mapping information may often be called as one-time URL mapping information. By means of the one-time URL mapping information, it is possible to store content identifications and one-time URLs in association with respective users that produce content delivery requests.

The relay processor 320 is adapted to transfer signals between the content delivering apparatus 100 and terminal 400. For instance, the processor 320 carries out the communicating process by using the Internet protocol as its communication protocol to relay packets received from the content delivering apparatus 100 to the terminals 400 and to relay packets received from the terminals 400 to the content delivering apparatus 100. The processor 320 also delivers received packets to the communication signal analyzer 330. In addition, the processor 320 receives packets from the delivery controller 340 and transmits the received packets toward the terminals 400.

The communication signal analyzer 330 is adapted to analyze received packets. The analyzer 330 includes a relayed-signal analyzer 331, a content delivery request analyzer 332, a one-time URL relaying section 333, a one-time URL analyzer 334 and a content delivery analyzer 335.

The relayed-signal analyzer 331 is adapted to refer to the source and destination addresses and message type of a received packet to determine which of the communications the packet should be directed to between the content delivering apparatus 100 and terminals 400, between the content caching and delivering server 300 and terminals 400, or between other communication devices. If the received packet is directed to a communication between other communication devices, the analyzer 331 transfers the received packet to the relay processor 320 to have the processor 320 relay the packet.

If the relayed-signal analyzer 331 determines that the received packet is directed to a communication between the content delivering apparatus 100 and terminal 400, then the content delivery request analyzer 332 analyzes the packet, when originating from the terminal 400 and including a content delivery request message, as to whether the received packet should be transmitted to the content delivering apparatus 100 or the requested content is already cached in the content caching and delivering server 300.

More specifically, if the relayed-signal analyzer 331 determines that the packet in question is directed to a communication between the content delivering apparatus 100 and terminal 400, then the content delivery request analyzer 332 references the content storage 360 to thereby determine whether or not the storage 360 contains an entry of a content identification for the video delivering request contained in the content delivery request message.

If the content identification of the content delivery request is not entered, the content delivery request analyzer 332 extracts a destination address, i.e. the address of the content delivering apparatus 100, a source address, i.e. the address of the terminal 400, and a content identification from the content delivery request message to store them in the storage 350. The analyzer 332 transfers the received packet to the relay processor 320 in order to transfer the packet from the processor 320 to the content delivering apparatus 100.

By contrast, if the content identification of the content delivery request is entered in the content storage 360, the content delivery request analyzer 332 transfers the source address and content identification in the content delivery request message to the delivery controller 340 in order that the delivery controller 340 issues a one-time URL as the access destination of the requested content.

If the relayed-signal analyzer 331 has determined the packet is directed to a communication between the content delivering apparatus 100 and terminal 400, and if the received packet has originated from the content delivering apparatus 100 and contains a one-time URL to be notified to the terminal 400 having requested the video delivery, then the one-time URL relaying section 333 stores the one-time URL of the received packet in the storage 350 and transfers the received packet to the relay processor 320 so as for the processor 320 to forward the packet to the terminal 400.

Specifically, the one-time URL relaying section 333 extracts the destination address, i.e. the address of the terminal 400, and the source address, i.e. the address of the content delivering apparatus 100, from the received packet, and determines whether or not the storage 350 contains an entry of mapping information of the extracted addresses.

If the mapping information of the extracted address is stored in the storage 350, the one-time URL relaying section 333 further maps the one-time URL to the mapping information of the extracted address to store the mapping information thus renewed into the storage 350, and transfers the received packet to the relay processor 320 so as for the processor 320 to transfer the packet to the terminal 400.

If the relayed-signal analyzer 331 determines that the received packet is directed to a communication between the content delivering apparatus 100 and terminal 400, and if the received packet has originated from the terminal 400 and contains an access signal to content, then the one-time URL analyzer 334 references the storage 350 to determine whether the one-time URL denoting an access destination is one issued by the content delivering apparatus 100 or the content caching and delivering server 300.

If the one-time URL is determined by the relayed-signal analyzer 331 as issued by the content delivering apparatus 100, the one-time URL analyzer 334 transfers the received packet to the relay processor 320 to render the processor 320 relay the packet to the apparatus 100. If the one-time URL is determined by the relayed-signal analyzer 331 as issued by the server 300, the one-time URL analyzer 334 causes the delivery controller 340 to deliver content corresponding to that one-time URL.

If the relayed-signal analyzer 331 determines that the received packet is directed to a communication between the content delivering apparatus 100 and terminal 400, and if the received packet has originated from the content delivering apparatus 100 and contains a content stream, then the content delivery analyzer 335 caches the content stream in the content storage 360 and transfers the received packet to the relay processor 320 so that the processor 320 relays the packet to the terminal 400.

More specifically, the content delivery analyzer 335 acquires a content stream from the received packet, and obtains a content identification from the storage 350 in accordance with the one-time URL mapping information 700, FIG. 7, described later on. The analyzer 335 uses the obtained content identification to examine whether or not the content identification has been entered in the content storage 360. If the content identification is not entered, the analyzer 335 decides that the content stream of that packet is not yet cached, and caches the content and transfers the received packet to the relay processor 320 so that the processor 320 forwards the packet to the terminal 400.

After the content delivery analyzer 335 thus caches the content stream and delivers the content stream to the terminal 400, it deletes from the storage 350 the mapping information of the content delivering apparatus, terminal address, content identification and one-time URL. At that moment, the analyzer 335 deletes at least the relationship of the content identification with the one-time URL. Additionally, the content delivery analyzer 335 maps the content storage address stored in the content storage 360 to the content identification to store the resultant mapping information in the content storage 360.

The delivery controller 340 is responsive to a video delivery request packet from the terminal 400 for content stored in the content storage 360 to control the delivery of the requested content. As shown in FIG. 4, the delivery controller 340 includes a one-time URL generator 341 and a content delivery processor 342.

The one-time URL generator 341 functions as issuing, when the content identification of a content delivery request from the terminal 400 has been entered in the content storage 360, a one-time URL as the access source of content so that the relay processor 320 will transfer a packet containing the issued one-time URL to the terminal 400. The one-time URL generator 341 stores in the storage 350 the source address, i.e. address of the terminal 400, content identification and one-time URL of the video delivery request packet.

The content delivery processor 342 is responsive to the one-time URL analyzer 334 having decided that access is made to the one-time URL the server 300 has issued to reference the storage 350 to thereby acquire a content stream associated with the content identification corresponding to the one-time URL from the content storage 360 to allow the relay processor 320 to assemble packets including the content stream to transmit them to the terminal 400 that has requested the content delivery.

Figure 5:
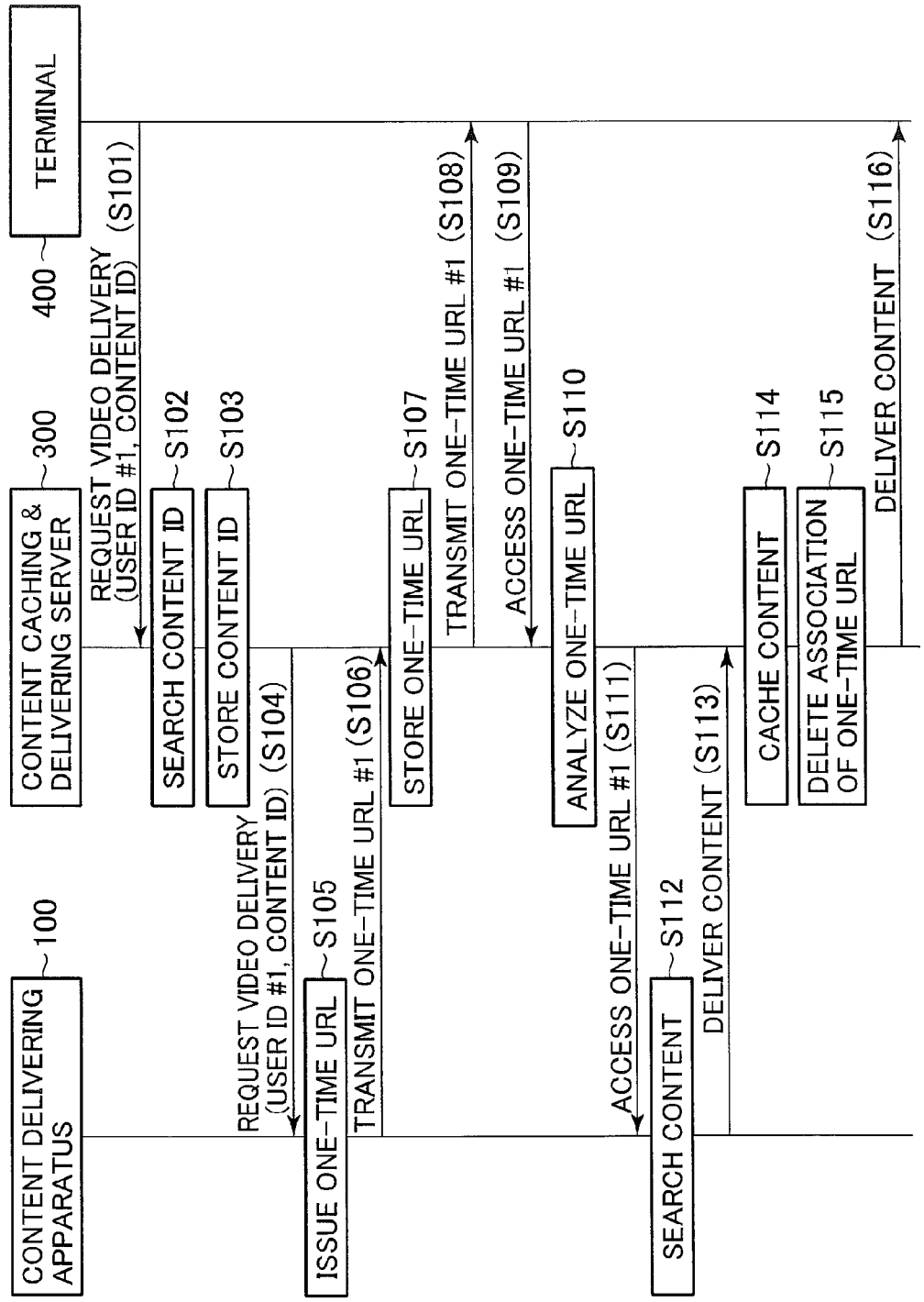
FIG. 5 is a sequence chart useful for understanding the process of delivering content first in response to a video delivery request in accordance with the illustrative embodiment.
Figure 6:
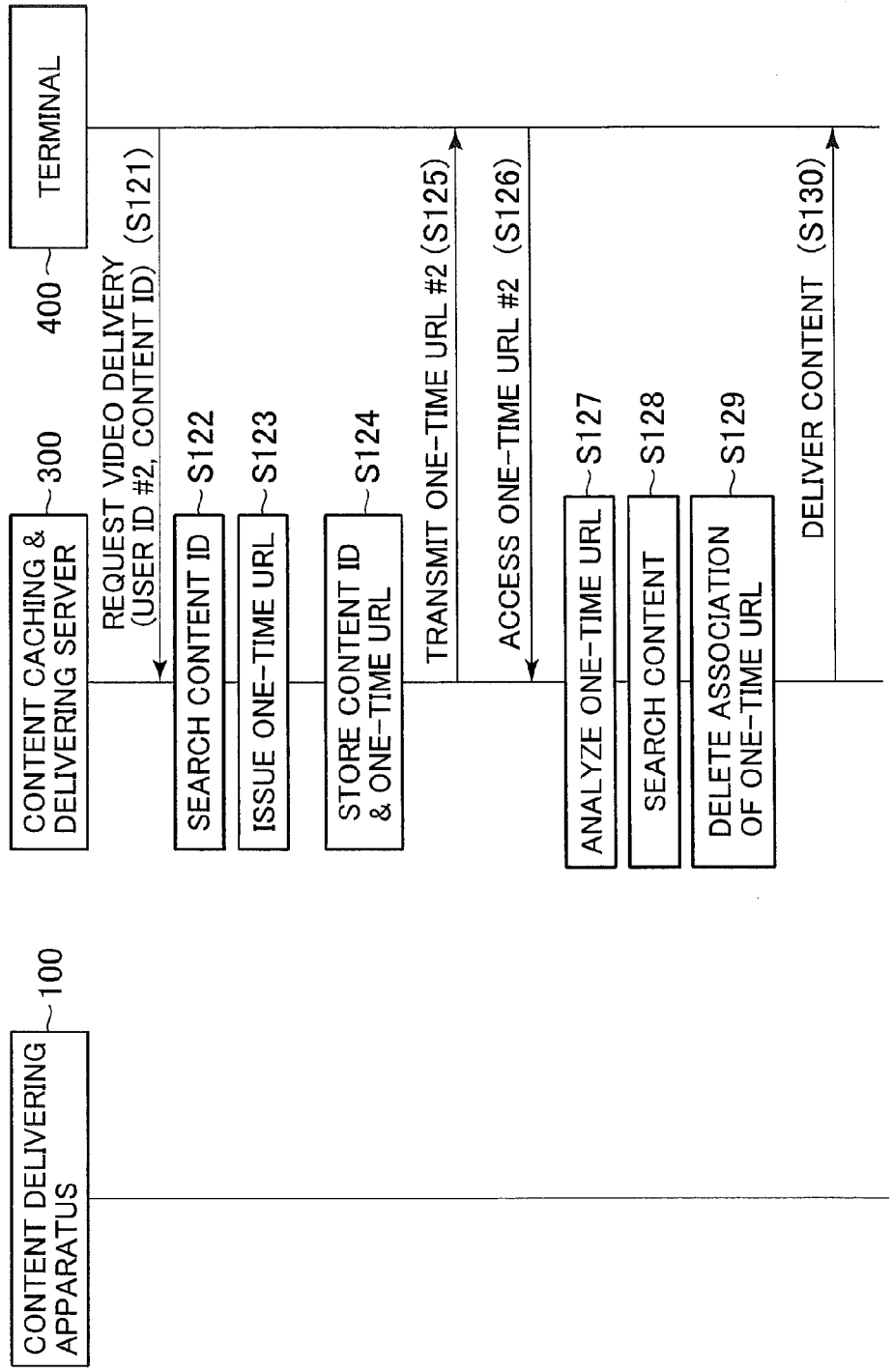
FIG. 6 is a sequence chart, like FIG. 5, useful for understanding the process of delivering content in response to a subsequent video delivery request for the same content in the embodiment.

FIGS. 5 and 6 are sequence charts showing the operation of content delivering process in accordance with the illustrative embodiment described above. FIG. 5 shows the process of delivering content first in response to a video delivery request for that content. FIG. 6 shows the process of delivering content in response to a subsequent video delivery request for the same content.

First with reference to FIG. 5, it will be described how content is distributed in response to a video delivery request that first requests for delivery of content with the illustrative embodiment. As shown in the figure, in the terminal 400, the content delivery request processor 411 allows the communicator 420 transmit a packet containing a content or video delivering request toward the content delivering apparatus 100 via the content caching and delivering server 300 (step S101). The packet for content delivery request has its source address set to the address of that terminal 400 and its destination address set to the address of the content delivering apparatus 100. The content delivery request message has the content identification of the content requested to deliver.

In the content caching and delivering server 300, the relay processor 320, relayed-signal analyzer 331 and content delivery request analyzer 332 receive the packet having the content delivery request message from the terminal 400, and extract the content identification from the message to reference the content storage 360 with the content identification to examine whether or not the content identification has been entered or registered in the storage 360 (step S102).

In the current example being described, the delivery request for content is raised for the first time for that content, and hence the content stream of the content has not yet been cached in the content caching and delivering server 300. Therefore, in the content caching and delivering server 300, the content delivery request analyzer 332 fails to locate the content identification in question in the cache. In turn, the content delivery request analyzer 332 extracts from the content delivery request message the source address, i.e. terminal address, destination address, i.e. content delivering apparatus address, and content identification to store the extracted data in the storage 350 (step S103).

FIG. 7 shows an example of one-time URL mapping information table 700 stored in the storage 350. As seen from the figure, the one-time URL mapping information table 700 is constituted of data fields named a content delivering apparatus address 711, a terminal address 713, a content identification 715 and a one-time URL 717. In the step S103, FIG. 5, the content delivery request analyzer 332 writes, as in a data entry 701 in FIG. 7, the content delivering apparatus address, terminal address and content identification in the one-time URL mapping information table 700.

Returning to FIG. 5, in the content caching and delivering server 300, the content delivery request analyzer 332 and relay processor 320 relay the packet having the content delivery request message received from the terminal 400 to the content delivering apparatus 100 (step S104).

Then, in the content delivering apparatus 100, the content delivery request receiver 111 and communicator 120 receive the packet originating from the terminal 400 via the content caching and delivering server 300 to thereby obtain the content delivery request message. The receiver 111 refers to the content storage 140 to extract a content identification from the content delivery request message. Subsequently, the one-time URL generator 112 issues a one-time URL corresponding to the access destination of the content, from which the content is available (step S105).

At that moment, in order to maintain the correspondence of the content identification to the issued one-time URL, the one-time URL generator 112 maps the content identification to the issued one-time URL and stores the mapping in the storage 130.

In the content delivering apparatus 100, the one-time URL generator 112 and communicator 120 transmit a packet carrying a message containing the issued one-time URL toward the terminal 400 via the content caching and delivering server 300 (step S106).

In the content caching and delivering server 300, the relay processor 320, relayed-signal analyzer 331 and one-time URL relaying section 333 receive the packet containing the one-time URL from the content delivering apparatus 100 to store the one-time URL of the received packet in the form of one-time URL mapping information in the storage 350 (step S107).

In the instant example, the storage 350 in the content caching and delivering server 300 has the data entry 701 stored as shown in FIG. 7 in. The one-time URL relaying section 333 maps the acquired one-time URL to the data entry 701 and stores the mapping. Thus, the one-time URL relaying section 333 updates the data entry 701 to a data entry 702 as depicted with an arrow 719. In the content caching and delivering server 300, the relay processor 320 and one-time URL relaying section 333 transfer the packet carrying the message containing the one-time URL received from the content delivering apparatus 100 to the terminal 400 (step S108).

In the terminal 400, the one-time URL acquirer 412 and communicator 420 receive that packet from the content delivering apparatus 100 through the content caching and delivering server 300 to extract the one-time URL from the packet. In the terminal 400, the one-time URL accessor 413 and communicator 420 make access to the one-time URL of the received packet in order to acquire the content (step S109). Specifically, the terminal 400 assembles and transmits a packet serving as an access signal and having its access destination set to the one-time URL in question toward the content delivering apparatus 100 via the content caching and delivering server 300.

In the content caching and delivering server 300, in turn, the relay processor 320, relayed-signal analyzer 331 and one-time URL analyzer 334 receive the packet of access signal containing the one-time URL from the content delivering apparatus 100 to analyze whether or not the one-time URL of the access signal is one issued by the server 300 (step S110). For instance, the content caching and delivering server 300 may be adapted for storing one-time URLs the server itself has issued so as to reference the stored one-time URLs to determine whether or not received one-time URLs are ones the server itself has issued.

Alternatively, for instance, the content caching and delivering server 300 may be adapted for referring to the one-time URL mapping information table 700, FIG. 7, in the storage 350 to decide whether or not acquired one-time URLs are ones the server itself has issued. More specifically with the example being described, the data entry 702, FIG. 7, is registered, and the one-time URL is made associated with the content delivering apparatus address, terminal address and content identification. It is therefore possible to decide that the one-time URL in question is one issued by the content delivering apparatus 100.

In this example, the one-time URL is not one issued by the content caching and delivering server 300. Hence in the server 300, the relay processor 320 and one-time URL analyzer 334 relay the packet of access signal, containing the one-time URL and received from the terminal 400, to the content delivering apparatus 100 (step S111). At that moment, the content caching and delivering server 300 prepares themselves for a response to the message thus relayed to the apparatus 100, that is, for acquisition of the content responsive to the access signal.

In the content delivering apparatus 100, when the content delivery processor 113 and communicator 120 receive the packet from the terminal 400 via the content caching and delivering server 300 to receive an access to the one-time URL, the mapping information of content identifications to one-time URLs in the storage 130 is referenced to locate and read out a content identification associated with the one-time URL. The content delivery processor 113 of the content delivering apparatus 100 then uses the content identification thus located to search the content storage 140 for content correspondent to the content identification (step S112). In turn, the content delivery processor 113 and communicator 120 assemble and transmit packets containing a stream of the content thus searched for toward the terminal via the content caching and delivering server 300 (step S113).

In the content caching and delivering server 300, the relay processor 320, relayed-signal analyzer 331 and content delivery analyzer 335 receive the packets carrying the content stream from the content delivering apparatus 100, and then the one-time URL mapping information table 700 is referred to to decide whether or not the content storage 360 contains an entry corresponding to the content identification thus received. In this exemplified case, since the content identification has not yet been entered, the content delivery analyzer 335 of the content caching and delivering server 300 caches or stores the content stream of the received packets in the content storage 360 (step S114).

In the content caching and delivering server 300 also, the relay processor 320 and content delivery analyzer 335 delete the association of the content identification with the one-time URL of the cached content (step S115), and transmit the packets having the content stream to the terminal 400 (step S116).

In turn, in the terminal 400 that has transmitted the content delivery request, the content acquirer 414 and communicator 420 receive the packets transmitted from the content delivering apparatus 100 via the content caching and delivering server 300 to reproduce the content stream from the packets to play the content or video data.

Next, the content delivering process to a subsequent video delivery request for the same content with the illustrative embodiment will be described with reference to FIG. 6. In the terminal 400, the content delivery request processor 411 and communicator 420 again transmit a packet containing a content delivery request message to the content delivering apparatus 100 through the content caching and delivering server 300 (step S121), the message including the same content identification as the content the terminal 400 requested in the process shown in FIG. 5.

In the content caching and delivering server 300, the relay processor 320, relayed-signal analyzer 331 and content delivery request analyzer 332 receive the packet having the content delivery request message from the terminal 400 to extract the content identification from the message to refer to the content storage 360 to thereby examine whether or not the content identification is one already entered (step S122).

In the current example, the delivery request to content is raised the second time for the same content as already cached in the content caching and delivering server 300. Therefore, in the content caching and delivering server 300, the content delivery request analyzer 332 is successful in locating one and the same content identification. Then, the one-time URL generator 341 issues a one-time URL as the destination for accessing to the cached content (step S123).

The one-time URL generator 341 maps the content identification in the packet of the content delivery request to the issued one-time URL, and stores the mapping in the one-time URL mapping information table 700 in the storage 350 (step S124).

The one-time URL generator 341 maps, as in a data entry 703 shown in FIG. 7, for instance, the terminal address as the source address of the packet of the content delivery request to the content identification and issued one-time URL, and stores the mapping.

In the content caching and delivering server 300, the relay processor 320 and one-time URL generator 341 transmit the packet containing the one-time URL issued in response to the requested content toward the terminal 400 (step S126).

In the terminal 400 that has requested a repetitive delivery of the same content, the one-time URL acquirer 412 and communicator 420 receive the packet from the content caching and delivering server 300 to take out the one-time URL from the packet. In the terminal 400, the one-time URL accessor 413 and communicator 420 make access to the one-time URL of the received packet in order to acquire the content (step S126). Specifically, the terminal 400 assembles and transmits a packet serving as an access signal and having its the access destination set to the one-time URL toward the content caching and delivering server 300.

In the content caching and delivering server 300, the relay processor 320, relayed-signal analyzer 331 and one-time URL analyzer 334 receive the packet of access signal containing the one-time URL from the terminal 400 to analyze whether or not the one-time URL of the access signal is one issued by the server 300 (step S127).

In this case also, for instance, the content caching and delivering server 300 may be adapted for storing, as described above, the one-time URL the server itself has issued so as to reference the stored one-time URLs to determine whether or not received one-time URLs are ones the server itself has issued. Alternatively, for instance, the content caching and delivering server 300 may be adapted for referring to the one-time URL mapping information table 700, FIG. 7, in the storage 350 to determine whether or not acquired one-time URLs are ones the server itself has issued. More specifically, in the current example, the data entry 703, FIG. 7, is already registered, the one-time URL of the data entry 703 is not made associated with the content delivering apparatus address but with the terminal address and content identification. It is therefore possible to decide that the present one-time URL in question is one issued by the content caching and delivering server 300.

In the content caching and delivering server 300, the content delivery processor 342 refers to the one-time URL mapping information table 700 in the storage 350 to readout a content identification associated with the one-time URL, and search the content storage 360 with the content identification thus read out for content corresponding to the identification (step S127).

In the content caching and delivering server 300 also, the relay processor 320 and content delivery processor 342 delete the association of the content identification with the one-time URL of the cached content (step S129), and transmit packets containing a stream of the content thus located toward the terminal 400 (step S130).

In turn, in the terminal 400 that has transmitted the repetitive content delivery request, the content acquirer 414 and communicator 420 receive the packets from the content caching and delivering server 300 to reproduce the content stream from the packets to play the content or video data.

In accordance with the illustrative embodiment described so far, when the same video contents are repeatedly requested for delivery, it is possible to decrease the load of the video traffic streaming over the network 10 in response to subsequent requests for the same contents between the content delivering apparatus 100 and content caching and delivering server 300.

Moreover, in accordance with the illustrative embodiment, because video traffic delivered from the content caching and delivering server 300 is not involved in communications with the content delivering apparatus 100, the transfer rate of the video traffic is faster than that of the transfer from the content delivering apparatus 100, thereby accomplishing stable transfer of video data with delay minimized in viewing video.

Further, since the illustrative embodiment may be implemented by simply adapting the content caching and delivering server 300 for storing content or content streams, the advantages of the embodiment may be attained without depending upon protocols, such as a Real-time Transport Protocol (RTP) or a HyperText Transfer Protocol (HTTP), on which contents are delivered.

Furthermore, in accordance with the illustrative embodiment, the content caching and delivering server 300 caches contents by means of information on contents. It is therefore also possible to take the advantages of the embodiment as well even when information, such as user information, other than information on content included in a content delivery request provided from a viewer or user is changed.

Next, with reference to further figures also, an alternative embodiment of a content delivering system in accordance with the present invention will be described in detail. The alternative embodiment is also adapted to utilize in-network caching.

For instance, communication terminals may include personal computers, television (TV) receivers compatible with IP multicast broadcasting, or mobile phones, such as smart phones, capable of streaming. To those terminals, a variety of video delivery protocols have to be applied depending upon terminals. For instance, terminals compatible with the IP multicast broadcasting use the RTP whereas other terminals, such as smart phones, use the HTTP Live Streaming (HLS). Different video delivery protocols define respective own formats, transfer rates, resolutions and file sizes, which may be different protocol by protocol.

Under those circumstances, the alternative embodiment is adapted such that the content caching and delivering server 300 is configured to deliver contents appropriately for video delivery protocols of the terminals 400.

The alternative embodiment may be the same as the illustrative embodiment shown and described with reference to FIGS. 1-7 except for the functional structure of the content caching and delivering server 300. For simplicity, the alternative embodiment will therefore be described with reference to FIGS. 1, 2 and 3 with focus specifically made on the functional structure of the content caching and delivering server 300 different from the earlier-described embodiment. Of course, throughout the application, like components are designated with the same reference numerals and symbols.

Figure 8:
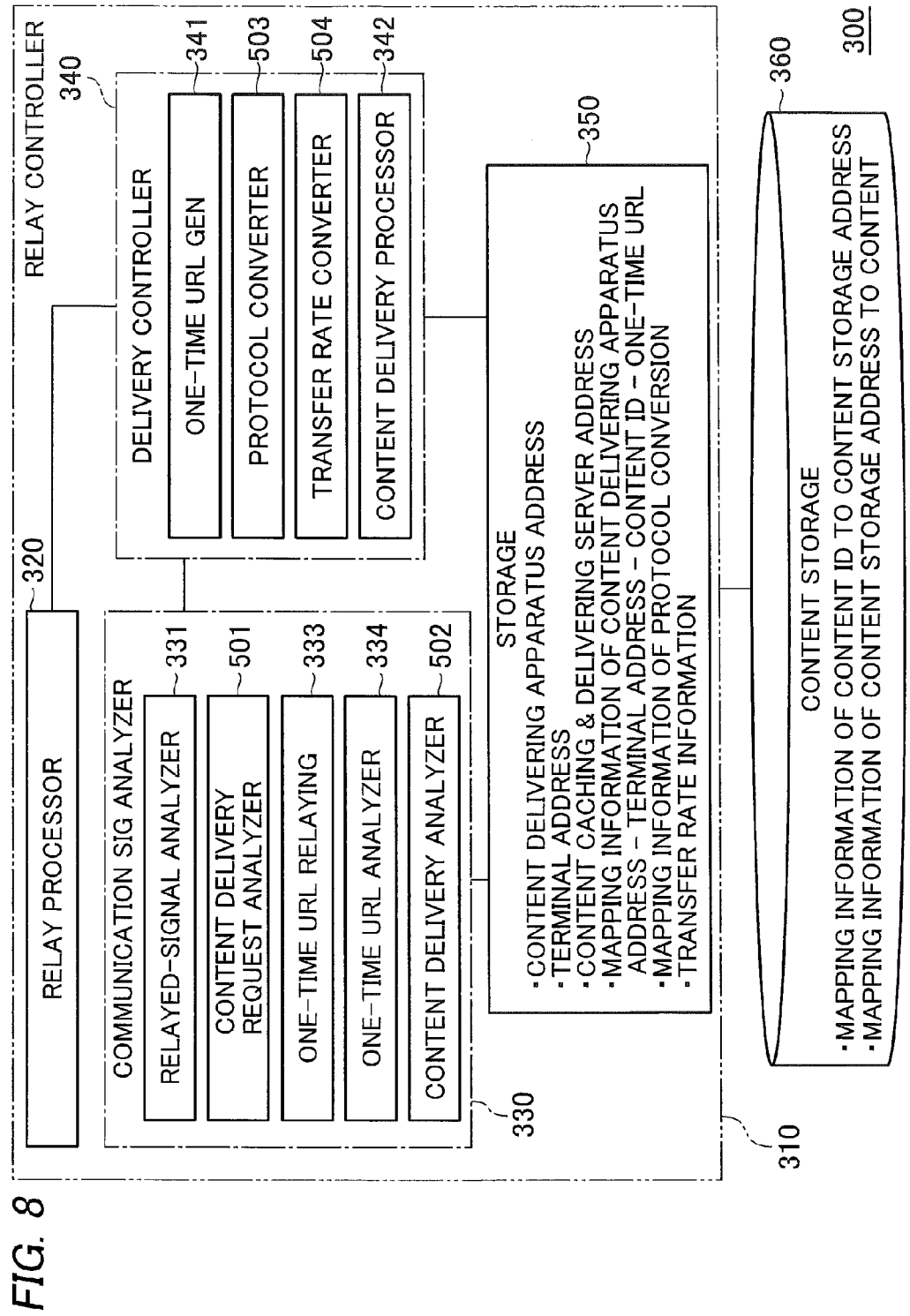
FIG. 8 is a schematic block diagram showing the internal configuration of a content caching and delivering server in accordance with an alternative embodiment of the invention.

FIG. 8 shows the internal configuration of the content caching and delivering server 300 in accordance with the alternative embodiment. As can be understood from FIG. 8, the content caching and delivering server 300 of the alternative embodiment includes the relay controller 310 and content storage 360. The relay controller 310 includes the relay processor 320, communication signal analyzer 330, delivery controller 340 and storage 350.

The content caching and delivering server 300 of the alternative embodiment may also be implemented by a processor system as described earlier. The functions of the server 300 may be implemented, at least partly, by program sequences stored and running in the processor system.

The communication signal analyzer 330 may include a content delivery request analyzer 501 and a content delivery analyzer 502 rather than the content delivery request analyzer 332 and content delivery analyzer 335 of the earlier-described embodiment. The delivery controller 340 may include a protocol converter 503 and a transfer rate converter 504 in addition to the one-time URL generator 341 and content delivery processor 342 of the earlier-described embodiment.

Figure 4:
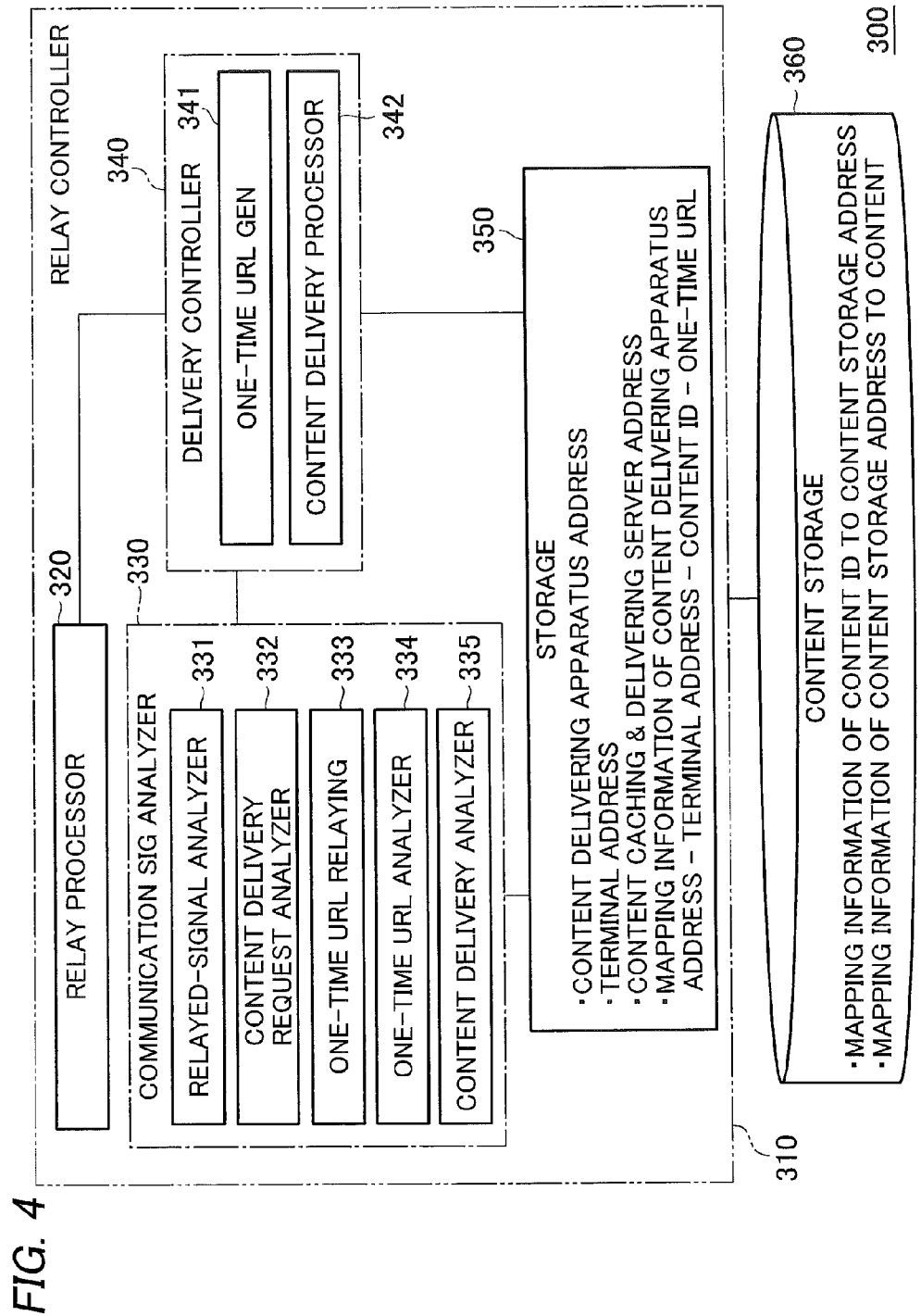
FIG. 4 is a schematic block diagram showing the internal configuration of a content caching and delivering server in accordance with the illustrative embodiment.

The content delivery request analyzer 501 is adapted, as with the content delivery request analyzer 332, FIG. 4, to use a content identification of a content delivery request message to determine whether or not whether or not the requested content is cached in the server 300. The analyzer 501 is also adapted to use information included in a content delivery request message obtained to determine the type of video delivery protocol for use.

The content delivery analyzer 502 is adapted, as with the content delivery analyzer 335, FIG. 4, to cache content streams transferred from the content delivering apparatus 100. In this connection, the analyzer 502 is adapted to necessarily acquire and cache streams of video contents under high-quality video formats, such as Moving Picture Experts Group 2 (MPEG2) or H.264 recommended by the ITU-T (International Telecommunication Union Telecommunication Standardization Sector), stored in the content storage 140 of the apparatus 100.

For instance, video data under an HLS format applied to the smart phone has lower resolution and smaller data size than other video data formats with an IP multicast format. Generally, when content delivery request packets are transmitted from smart phone terminals, a content delivering apparatus would deliver content streams under the HLS format. However, the alternative embodiment is adapted such that, when content delivery request packets are transmitted from smart phone terminals, the content delivery analyzer 502 acquires high-quality content streams with high resolution and high bit rate.

The protocol converter 503 is adapted to convert, when content streams are delivered to the terminals 400, the resolution, bit rate and format of the video data according to respective video delivery protocols. The protocol converter 503 carries out protocol conversion according to protocol conversion mapping information stored in the storage 350. In the embodiment, the protocol conversion mapping information contains information on conversion, such as resolutions, data sizes and formats, across a plurality of protocols.

The transfer rate converter 504 is adapted to convert the transfer rate of content streams at which the streams are to be delivered to the terminals 400.

Figure 9:
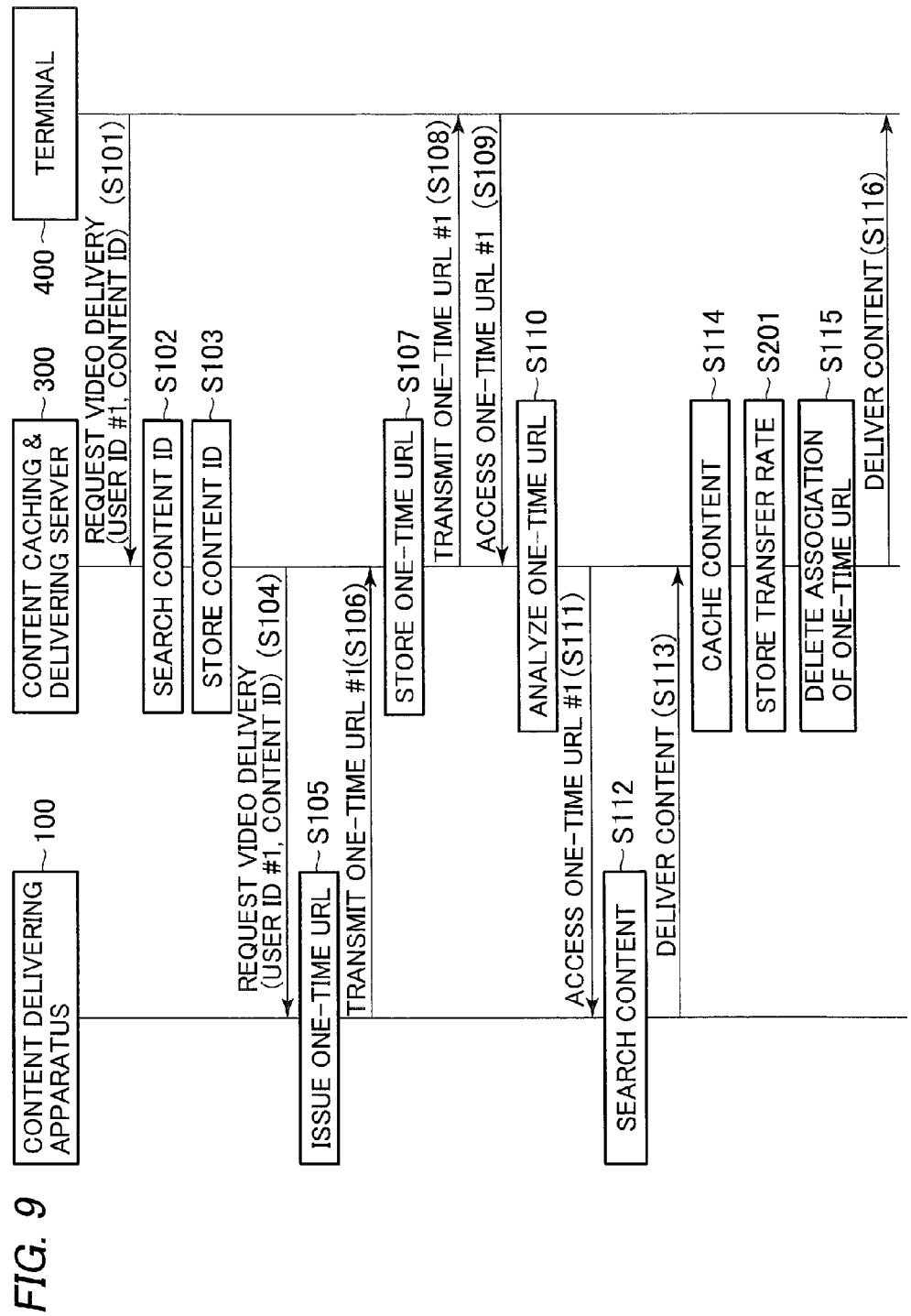
FIG. 9 is a sequence chart useful for understanding the operation of delivering content first in response to a video delivery request in accordance with the alternative embodiment shown in FIG. 8.

FIGS. 9 and 10 are sequence charts showing the operation of content delivering process in accordance with the alternative embodiment. FIG. 9 shows the process of delivering content first in response to a video delivery request for that content. FIG. 10 shows the process of delivering content in response to a subsequent video delivery request for the same content. In FIGS. 9 and 10, like or correspondent processes to those of the earlier-described illustrative embodiment are designated with the same reference numerals and symbols.

In FIG. 9, in the steps S101 to S108, the terminal 400 transmits a packet carrying a video or content delivery request message to the content delivering apparatus 100 via the content caching and delivering server 300, and the apparatus 100 issues a one-time URL for notification, as with the illustrative embodiment shown in and described with reference to FIG. 5.

The terminal 400 accesses the one-time URL via the content caching and delivering server 300 in order to acquire the content (steps S109 to S111). The content delivering apparatus 100 delivers packets carrying a stream of the content, and then in the server 300 the relay processor 320, relayed-signal analyzer 331 and content delivery analyzer 502 cause the content stream to be cached in the content storage 360 (step S114) and information on the transfer rate of the video data to be stored in the storage 350 (step S201).

With the alternative embodiment, the content delivering apparatus 100 is adapted for transmitting high-quality content streams to the content caching and delivering server 300, and the server 300 is adapted to cache high-quality content streams.

In the subsequent processes, the alternative embodiment will proceed in the similar way to the earlier-described embodiment so that the content caching and delivering server 300 deletes the information on association of the one-time URL (step S115) and delivers the high-quality content to the terminal 400 (step S116).

If the terminal 400 requests video delivery under the HLS format, processes of the protocol converter 503 and transfer rate converter 504 described below with reference to FIG. 10 may be carried out.

Next, with reference to FIG. 10, it will be described how the video or content delivering process is proceeded to in the alternative embodiment in response to a subsequent video delivery request for the same content.

In FIG. 10, in the steps S121 to S125, the terminal 400 requests video or content delivery, and the content caching and delivering server 300 issues a one-time URL for notification, as with the earlier-described illustrative embodiment.

The terminal 400 accesses the one-time URL through the content caching and delivering server 300 in order to acquire the content (step S126). In the content caching and delivering server 300, the relay processor 320, relayed-signal analyzer 331 and one-time URL analyzer 334 analyze the one-time URL (step S127), and the content delivery processor 342 searches the content from the content storage 360 (step S128).

At that moment, in the content caching and delivering server 300, the protocol converter 503 refers to the protocol conversion mapping information to convert the video delivery protocol of video data acquired from the content storage 360 to that of the terminal 400 analyzed by the content delivery request analyzer 501 (step S202). Moreover, the transfer rate converter 504 converts the transfer rate of the content stream to that of the HLS format requested from the terminal 400 (step S203).

In the subsequent processes, the alternative embodiment will proceed in the similar way to the earlier-described illustrative embodiment so that the content caching and delivering server 300 deletes the association of the one-time URL (step S129) and delivers the content to the terminal 400 (step S130).

The alternative embodiment described above enjoys, in addition to the advantages of the earlier-described embodiment, an advantage that it is possible to deliver video contents or video content streams that have the protocols thereof converted according to video delivery requests provided from the terminals 400.

In addition to the illustrative embodiments described so far, various modifications or alternative embodiments may be provided in accordance with the invention. For example, the above description on the illustrative embodiments has proceeded such that the same terminal requests for delivery of the same video content. However, those illustrative embodiments also work for different terminals asking for delivery of the same content. That is, when the deliveries of the same content are requested by the different terminals, the advantages of the illustrative embodiments described above can also be accomplished.

Moreover, the content delivering system 10 of the illustrative embodiments includes only one content caching and delivering server 300 merely for illustration. However, the system 10 may include content caching and delivering servers, such as 300, in plural, and the advantages of the invention can also be attained. Furthermore, such a plurality of servers may be configured in multistage or cascaded.

In the illustrative embodiments, in response to subsequent requests for video delivery of the same content, one-time URLs are generated by the content caching and delivering server 300. However, one-time URLs may be issued by other constituent devices or locations included in the content delivering system 10 than the content caching and delivering server 300.

For instance, the content delivering system 10 may be adapted such that the content caching and delivering server requests the content delivering apparatus to issue one-time URLs so that the content delivering apparatus issues one-time URLs. Alternatively, the content delivering system may be adapted such that the content caching and delivering server requests another apparatus, e.g. proxy device, to issue one-time URLs and the other apparatus produces one-time URLs. In those cases, the server may map one-time URLs of each apparatus to content identifications and manage the mapping, thereby accomplishing the advantages of the invention.

The entire disclosure of Japanese patent application No. 2012-206007 filed on Sep. 19, 2012, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A caching apparatus connected to a content delivering apparatus and to a communication terminal, the caching apparatus comprising:
   a content storage storing a content provided by the content delivering apparatus and a content identification of the content;
   a storage unit storing mapping information that maps a content identification to a one-time uniform resource locator (URL);
   a first information processor
      analyzing a first content delivery request, which is relayed from the communication terminal to the content delivering apparatus and includes a first content identification, and
      upon determining that the first content identification is not stored in said content storage, including the first content identification in first mapping information;
   a second information processor
      analyzing a first one-time URL, which is associated with the first content delivery request and is relayed from the content delivering apparatus to the communication terminal, and
      including the first one-time URL in the first mapping information and storing the first mapping information in said storage unit;
   a third information processor
      analyzing another one-time URL relayed from the communication terminal to the content delivering apparatus, and upon determining that the another one-time URL is included in the first mapping information, determining that the another one-time URL is issued by the content delivering apparatus; and a fourth information processor
receiving a first content that is associated with the first one-time URL and that is relayed from the content delivering apparatus to the communication terminal, obtaining the first content identification from the first mapping information, and
upon determining that the obtained first content identification is not stored in said content storage, storing a combination of the first content identification and the first content in said content storage while deleting the first mapping information.

2. The caching apparatus in accordance with claim 1, wherein
said first information processor uses first information included in the first content delivery request to analyze a communication condition for communicating with the communication terminal, and
said fourth information processor converts, prior to transmitting the first content to the communication terminal, the first content to a content satisfying the analyzed communication condition.

3. The caching apparatus in accordance with claim 2, wherein
said first information processor analyzes a video delivery protocol as the communication condition, and
said fourth information processor converts, prior to transmitting the first content to the communication terminal, the first content to a content satisfying the analyzed video delivery protocol.

4. The caching apparatus in accordance with claim 3, wherein said fourth information processor converts, on a basis of the analyzed video delivery protocol, one of a bit rate, a resolution and a format of video data of the first content.

5. The caching apparatus in accordance with claim 2, wherein said fourth information processor converts a transfer rate of the first content, before transmitting the first content to the communication terminal.

6. The caching apparatus in accordance with claim 1, further comprising:
a fifth information processor
receiving the first content delivery request from the communication terminal,
determining whether or not the first content identification included in the first content delivery request is stored in said content storage,
upon determining that the first content identification is stored in said content storage, producing a second one-time URL representing a destination at which the first content is available,
storing second mapping information, which maps the first content identification to the second one-time URL, in said storage unit, and
transmitting the second one-time URL to the communication terminal; and a sixth information processor
receiving yet another one-time URL from the communication terminal,
determining whether or not the yet another one-time URL is included in the second mapping information, and
upon determining that the yet another one-time URL is included in the second mapping information, obtaining the first content identification from the second mapping information, searching said content storage to retrieve the first content associated with the first content identification, deleting the second mapping information, and transmitting the retrieved first content to the communication terminal.

7. The caching apparatus in accordance with claim 6, wherein
said first information processor uses first information included in the first content delivery request to analyze a communication condition for communicating with the communication terminal, and
said fourth information processor converts, prior to transmitting the first content to the communication terminal, the first content to a content satisfying the analyzed communication condition.

8. The caching apparatus in accordance with claim 7, wherein
said first information processor analyzes a video delivery protocol as the communication condition, and
said fourth information processor converts, prior to transmitting the first content to the communication terminal, the first content to a content satisfying the analyzed video delivery protocol.

9. The caching apparatus in accordance with claim 8, wherein said fourth information processor converts, on a basis of the analyzed video delivery protocol, one of a bit rate, a resolution and a format of video data of the first content.

10. The caching apparatus in accordance with claim 6, wherein said fourth information processor converts a transfer rate of the first content, before transmitting the first content to the communication terminal.

11. A method for a caching apparatus connected to a content delivering apparatus and to a communication terminal, the caching apparatus including
a content storage storing a content provided by the content delivering apparatus and a content identification of the content, and
a storage unit storing mapping information that maps a content identification to a one-time uniform resource locator (URL);
the method comprising:
analyzing a first content delivery request, which is relayed from the communication terminal to the content delivering apparatus and includes a first content identification, and upon determining that the first content identification is not stored in the content storage, including the first content identification in first mapping information;
analyzing a first one-time URL, which is associated with the first content delivery request and is relayed from the content delivering apparatus to the communication terminal, including the first one-time URL in the first mapping information, and storing the first mapping information in said storage unit;
analyzing another one-time URL relayed from the communication terminal to the content delivering apparatus, and, upon determining that the another one-time URL is included in the first mapping information, determining that the another one-time URL is issued by the content delivering apparatus;
receiving a first content that is associated with the first one-time URL and that is relayed from the content delivering apparatus to the communication terminal, obtaining the first content identification from the first mapping information, and, upon determining that the obtained first content identification is not stored in said content storage, storing a combination of the first content identification and the first content in said content storage while deleting the first mapping information.

12. The method in accordance with claim 11, further comprising:

receiving the first content delivery request from the communication terminal;

determining whether or not the first content identification included in the first content delivery request is stored in said content storage;

upon determining that the first content identification is stored in said content storage, producing a second one-time URL representing a destination at which the first content is available, storing second mapping information, which maps the first content identification to the second one-time URL, in said storage unit,;

transmitting the second one-time URL to the communication terminal;

receiving yet another one-time URL from the communication terminal;

determining whether or not the yet another one-time URL is included in the second mapping information; and upon determining that the yet another one-time URL is included in the second mapping information, obtaining the first content identification from the second mapping information, searching said content storage to retrieve the first content associated with the first content identification, deleting the second mapping information, and transmitting the retrieved first content to the communication terminal.

13. A non-transitory computer-readable storage medium that is not a signal and on which a cache control program is stored, the cache control program, when installed in and running on a computer having a storage unit and a content storage, controlling the computer to function as a caching apparatus connected to a content delivering apparatus and to a communication terminal, the caching apparatus including:

a first information processor analyzing a first content delivery request, which is relayed from the communication terminal to the content delivering apparatus and includes a first content identification, and upon determining that the first content identification is not stored in said content storage, including the first content identification in first mapping information;

a second information processor analyzing a first one-time uniform resource locator (URL), which is associated with the first content delivery request and is relayed from the content delivering apparatus to the communication terminal, and including the first one-time URL in the first mapping information and storing the first mapping information in said storage unit;

a third information processor analyzing another one-time URL relayed from the communication terminal to the content delivering apparatus, and upon determining that the another one-time URL is included in the first mapping information, determining that the another one-time URL is issued by the content delivering apparatus; and a fourth information processor receiving a first content that is associated with the first one-time URL and that is relayed from the content delivering apparatus to the communication terminal, obtaining the first content identification from the first mapping information, and upon determining that the obtained first content identification is not stored in said content storage, storing a combination of the first content identification and the first content in said content storage while deleting the first mapping information.

14. The storage medium in accordance with claim 13, wherein the caching apparatus further includes:

a fifth information processor receiving the first content delivery request from the communication terminal, determining whether or not the first content identification included in the first content delivery request is stored in said content storage, upon determining that the first content identification is stored in said content storage, producing a second one-time URL representing a destination at which the first content is available, storing second mapping information, which maps the first content identification to the second one-time URL, in said storage unit, and transmitting the second one-time URL to the communication terminal; and a sixth information processor receiving yet another one-time URL from the communication terminal, determining whether or not the yet another one-time URL is included in the second mapping information, and upon determining that the yet another one-time URL is included in the second mapping information, obtaining the first content identification from the second mapping information, searching said content storage to retrieve the first content associated with the first content identification, deleting the second mapping information, and transmitting the retrieved first content to the communication terminal.

* * * * *